July 31, 1962   R. C. RANEY   3,047,173
TRANSPORTING AND UNLOADING DEVICES
Filed Sept. 23, 1959   2 Sheets-Sheet 1

INVENTOR
Richard Curry Raney
BY
ATTORNEY

July 31, 1962 R. C. RANEY 3,047,173
TRANSPORTING AND UNLOADING DEVICES
Filed Sept. 23, 1959 2 Sheets-Sheet 2

INVENTOR
Richard Curry Raney

BY
ATTORNEY

United States Patent Office 3,047,173
Patented July 31, 1962

3,047,173
TRANSPORTING AND UNLOADING DEVICES
Richard Curry Raney, Rte. 1, Cookville, Tex.
Filed Sept. 23, 1959, Ser. No. 841,750
8 Claims. (Cl. 214—519)

This invention relates to a transporting and unloading device and more particularly to a transporting and unloading device for cut forage and the like.

An object of the invention is to provide a new and improved transporting and unloading device for forage and the like.

Another object is to provide a transporting and unloading device for forage and the like which has a low center of gravity to provide for maximum stability of the device while it is being moved across rough terrain.

Still another object is to provide a transporting and unloading device for forage and the like which has upwardly and outwardly flared walls to provide a maximum storage volume for a given wheel base.

A further object is to provide a transporting and unloading device for forage and the like having a box provided with two parallel spaced sidewalls and a rear end wall extending upwardly and outwardly from a floor and having vertically spaced beaters extending transversely between the side walls adjacent the front ends thereof which may be selectively actuated to control the speed of loading of the forage or other material from the device.

A still further object is to provide a transporting and unloading device for forage and the like wherein a main conveyor extends about the box floor for moving the forage toward the beaters.

Another object is to provide a transporting and unloading device for forage and the like which is provided with a side delivery conveyor immediately forward of the floor and of the beaters whereby the cut forage may be unloaded into feeding troughs or the like from the box as the device is moved alongside the troughs.

Still another object is to provide a transporting and unloading device wherein the beaters are actuated intermittently and slowly so that the forage is not thrown about thereby whereby the beaters may serve to retain the forage on the floor and between the side and rear walls of the box obviating the need of a front wall.

A further object is to provide a transporting and unloading device for forage and the like wherein the side delivery conveyor is provided with a hinged extension at the right side of the device to minimize the complexity of the transmission required between a shaft driven by the usual power takeoff shaft of a tractor and the drive shaft of the side delivery conveyor.

A still further object of the invention is to provide a new and improved transporting and unloading device for forage and the like which is of simple economical construction and which has a minimum of operative parts.

Additional objects and advantages of the invention will be readily apparent from the reading of the following description of a device constructed in accordance with the invention, and reference to the accompanying drawings thereof, wherein.

Figure 1:
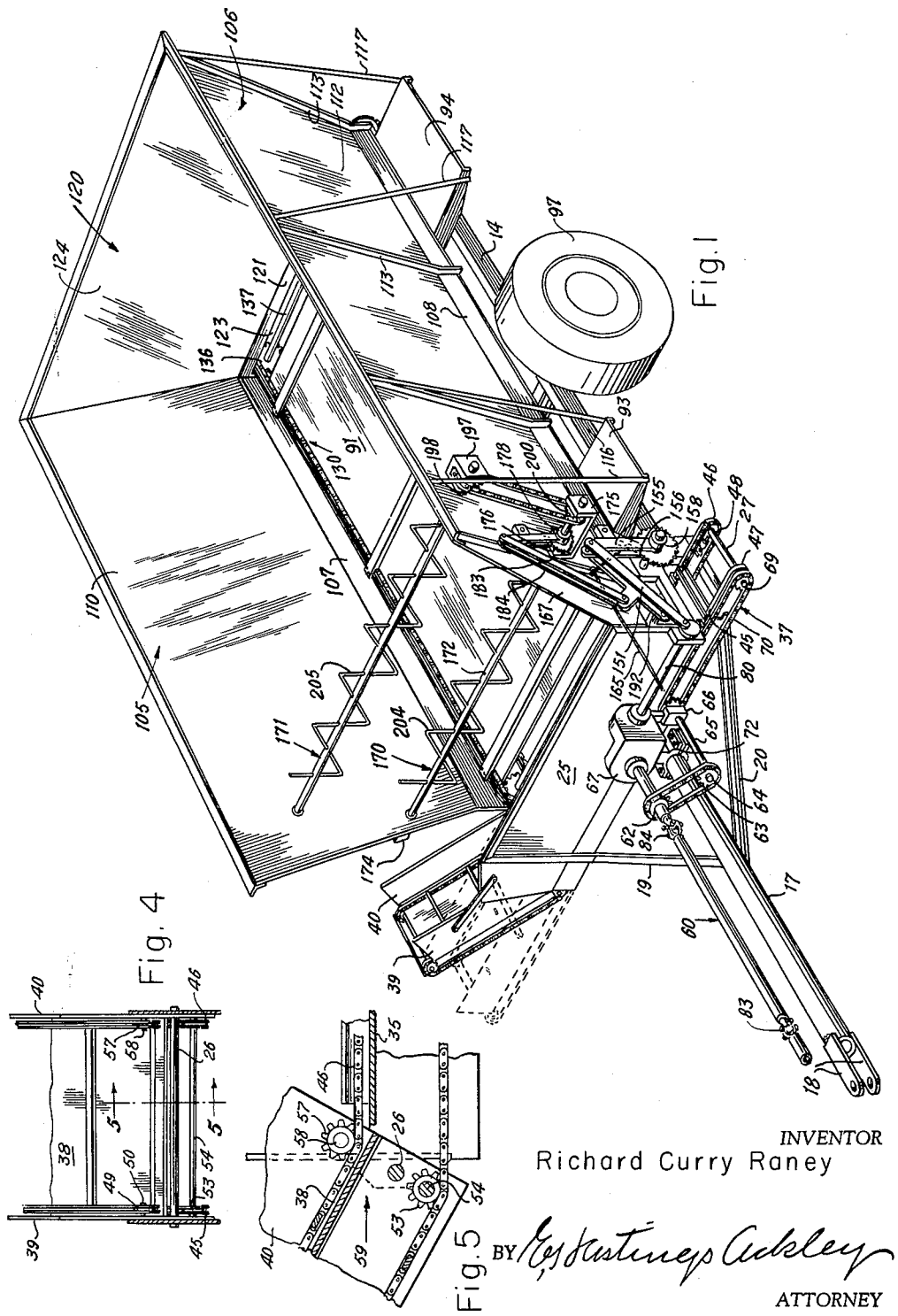
FIGURE 1 is a perspective view of the transporting and unloading device embodying the invention.

Referring now to the drawings, the transporting and unloading device for forage and the like includes a rectangular chassis 12 formed of a pair of side members 13 and 14 which are connected at their ends by transverse frame members 15 and 16. A rigid tongue 17 is connected to the front transverse frame member 15 and its rear end to the axle 101 by any suitable means, such as welding, and is provided at its front end with the brackets 18 by means of which it may be connected to the draw bar of a tractor. A pair of bracing members 19 and 20 extend rearwardly and outwardly from an intermediate point of the draw bar 17, to which they are rigidly secured by any suitable means, such as welding, to the forward extensions 21 and 22 which are secured to the front end of the chassis in any suitable maner, as by welding. A front shield 25 is secured to the chassis extensions in any suitable maner, as by welding.

A pair of side delivery conveyor shafts 26 and 27 are rotatably mounted on transverse plates 28 and 29 and 30 and 31, respectively, which are secured in any suitable manner, as by welding, to the shield and to the frame extensions 21 and 22. A transverse conveyor floor 35 is disposed rearwardly of the front shield 25. A side delivery conveyor 37 extends about the conveyor floor 35 and about the hinged side delivery floor extension 38. The floor extension has sides 39 and 40 rigid therewith which are pivotally mounted on the shaft 26 for movement between the upper full line position illustrated in FIGURE 1 and the lower discharge position illustrated in broken lines in FIGURE 1.

The side delivery conveyor extension 38 may be held in its raised position by means of a rod 44 having angularly bent end portions which are received in appropriate apertures in the front shield 25 and in the plate 39.

The conveyor 37 includes a pair of parallel chains 45 and 46 which extend about the drive sprockets 47 and 48 rigidly secured to the conveyor drive shaft 27, respectively. The chain 45 also extends under an idler sprocket 49 mounted on a spindle 50 journaled in the plate 39 above the shaft 26, about an idler sprocket 51 mounted on the shaft 52 journaled in the plates 39 and 40, and under a sprocket 53 mounted on a shaft 54 journaled in the plates 39 and 40 under the shaft 26. The chain 46 similarly extends under a sprocket 55 mounted on the shaft 54 about a sprocket 56 mounted on the shaft 52 and under sprocket 57 mounted on a spindle 58 journaled in the plate 40. The chains are connected by transverse slats 56 which move over the side conveyor floor 35 and its extension 38 and then downwardly below the extension 38 and the floor 35 as the drive shaft 27 is rotated, the transverse slats thus moving any forage or other material deposited on the floor 35 to the right of the transporting and unloading device when the side delivery extension 38 is in any position at an angle of 45 degrees or less from the horizontal.

Chain shields 58 and 59 are secured to the shield 25 and to the forward extensions 21 and 22 to overlie the chains 45 and 46, respectively, to prevent forage from clogging between the links of the chain and then clogging between the chains and the sprockets.

The drive shaft 27 is driven by a main drive shaft 60 which extends over the rigid tongue 17 and may be connected in any suitable manner to the power takeoff. When shaft 60 is rotated in the direction indicated by the arrow, in FIGURE 1, the shaft 27 will be rotated in a counterclockwise manner as seen in FIGURE 1 to cause the upper portions of the conveyor 37 to move toward the floor extension 38 to move any material deposited on the side delivery conveyor floor 35 over the extreme end of the floor extension 38.

The gear housing 67 is rigidly mounted on the tongue by means of the clamp 72. The main shaft 60 is journaled in the housing and is provided with a bevel gear 77 which is in mesh with a similar bevel gear 78 rigid on the shaft 80 journaled on the gear housing 67 and in the forward end of the extension 22. The main shaft may be provided with a pair of universal joints 83 and 84 forwardly of the sprocket 62 to provide accommodation for the pivotal movement of the tractor and of the takeoff shaft of the tractor relative to the tongue 17 and the gear housing 67.

A box 90 is mounted on the chassis rearwardly of the side delivery conveyor and includes a floor 91 rigidly secured in any suitable manner, as by welding, to a pair of inverted channel shaped transverse members 93 and 94 disposed on opposite sides of the wheels 96 and 97 on which the chassis 12 is mounted. The wheels are mounted on the usual bearing block 100 and 101 rigidly secured in any suitable manner to the side frame members 13 and 14, respectively. The box 90 also includes side walls 105 and 106 whose lower vertical portions 107 and 108 are rigidly secured to the floor in any suitable manner, as by welding, and whose upper portions 110 and 112, respectively, flare upwardly and outwardly. The side walls may be provided with suitable vertical reinforcing members 113 which are rigidly secured to the sides. The cross members 93 and 94 may extend outwardly of the sides to provide platforms on which persons may stand. The outer ends of the cross members 93 and 94 have upwardly extending bracing members 116 and 117, respectively, which are secured at their upper ends to the upper edge portions of the side walls and thus serve to rigidify the walls of the box.

The rear ends of the side walls 105 and 106 are connected by a rear wall 120 which has a vertical lower portion 121 extending between the vertical portions 107 and 108 of the side walls but not to the floor 91 so as to provide a transverse vertical slot 123 rearwardly of the floor 91. The upper portion 124 of the rear wall flares upwardly and outwardly.

A main conveyor 130 extends about the box floor 91 and includes a pair of chains 131 and 132. The chain 131 extends about a sprocket 134 rigidly secured to a drive shaft 135 journaled in the frame extensions 21 and 22 and about a sprocket 136 mounted on a shaft 137. The shaft is supported on blocks 138 secured to the chassis 12 rearwardly of the floor 91. The chain 132 similarly extends about a sprocket 140 rigidly secured to the front drive shaft 135 and about a sprocket 141 mounted to the shaft 137. The ends of the shaft 137 are received in the support or bearing blocks 142 and their distance from the drive shaft 135 may be adjusted by means of the adjusting screws 144 whose ends bear against the bearings 142 slidably mounted in the slots of the blocks 138.

Figure 2:
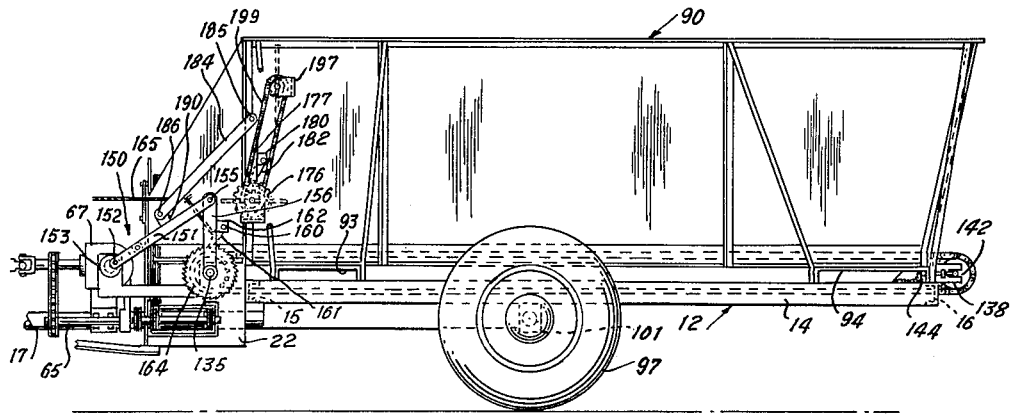
FIGURE 2 is a side view of the transporting and unloading device.
Figure 3:
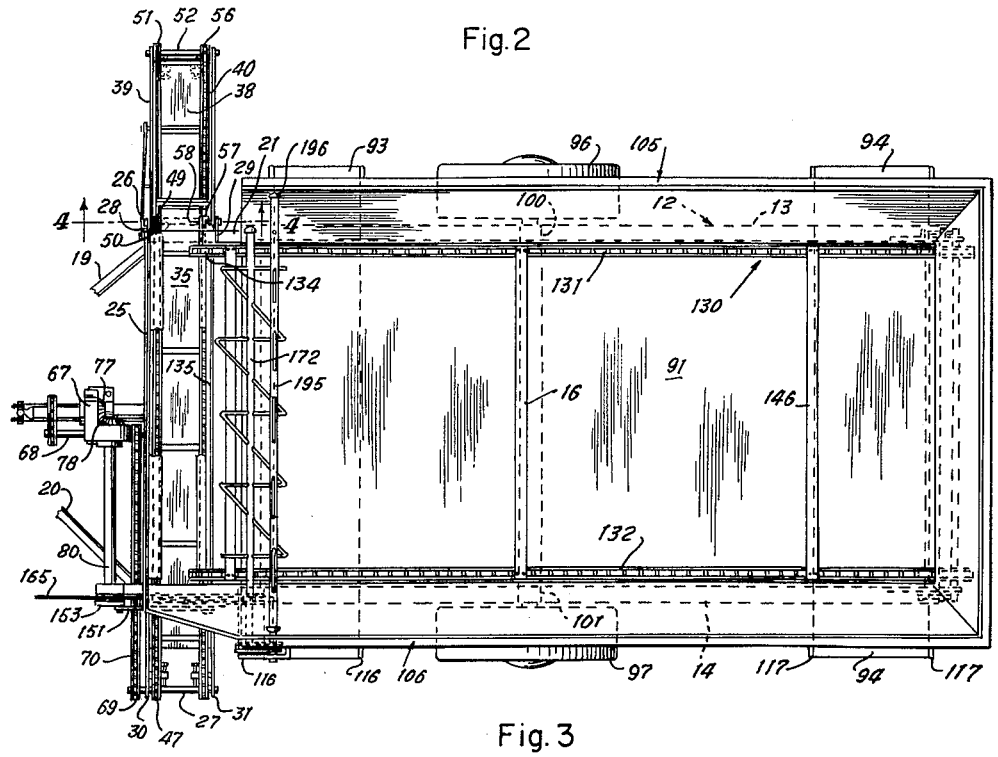
FIGURE 3 is a plan view of the transporting and unloading device.

The chains 131 and 132 are connected by transverse slats 146 which move any material deposited on the box floor forwardly toward the side delivery conveyor when the drive shaft 135 is rotated in a counter-clockwise manner as seen in FIGURES 1 and 2. The conveyor drive shaft 135 is rotated when the main drive shaft is rotated to cause the chains 131 and 132 to revolve about their sprockets and cause the slats 146 to move over the floor 91 toward the front of the box and then downwardly below the floor 91, to the rear box floor then back through the slot 123 upwardly above the box floor and then forwardly again. The chains and slats may pass through suitable slots cut in the transverse frame member 15 and 16.

The main conveyor drive shaft 137 is rotated in a step by step manner by means of a pawl and ratchet transmission drive 150 which includes a link 151 pivotally connected, as at 152, to drive disk 153 rigidly secured to the connecting shaft 80 at a point spaced from the axis of rotation of the drive disk. The link 151 has its upper end pivotally secured in any suitable manner, as by a pivot pin 155, to a pair of arms 155 and 156 whose lower ends have hubs 158 rotatably mounted on the main conveyor drive shaft 137. The arms 155 and 156 have rigidly connected to them as by welding, a pawl block 160 to which is pivotally connected a pawl 161 by a pin 162. The pawl 161 has a pointed free end which is adapted to engage the teeth of the toothed disk 164 rigidly secured to the drive shaft 135. The shape of the free end of the pawl and the inclinations of the teeth of the toothed disk 164 are such that the pawl will engage a tooth and cause the drive disk 164, and therefore the main conveyor drive shaft 137, to rotate in a counter-clockwise manner a predetermined angular distance during one half of a counter-clockwise revolution of the drive disk and then cause the pawl to move in a clockwise manner during the next one half of the counter-clockwise revolution to ride over the next tooth to engage it upon the commencement of the next revolution of the drive disk 153. In this manner the ratchet and pawl transmission 150 causes the main conveyor drive shaft and therefore the main conveyor 130 to move intermittently in a step by step manner over the floor 91 of the box toward the side conveyor whenever the pawl is in the lower toothed disk engaging position illustrated in the drawings. A drawstring 165 may have one end attached to the pawl and extend, through a suitable aperture in a bracket 166 rigidly secured to the forward extension 167 of the box side wall 106, to a vicinity adjacent the driver's seat of a tractor by means of which the device 10 is being propelled. The drawstring permits the operator to disengage the pawl whenever he so desires by pulling on the drawstring 165 so that the operation of the main conveyor may be stopped even while the forward movement of the device continues and the main drive shaft 60 continues to be rotated by the power takeoff shaft of the tractor by means of which it is being towed.

A pair of vertically spaced beaters 170 and 171, the upper beater 171 being spaced rearwardly from the lower beater 170, extend transversely between the side walls 105 and 106 of the box adjacent the front ends thereof. The lower beater includes a shaft 172 one of whose ends is journaled in a bearing block 174 rigidly secured by welding or in any other suitable manner to the side wall 105 of the box and the other of whose ends outwardly of the side 106 is journaled in the upstanding arms of a bearing bracket 175 rigidly secured in any suitable manner, as by welding, to the side 106. The shaft 172 of course extends through suitable apertures in the side walls 105 and 106 of the box. The shaft 172 is provided with a toothed wheel 176 rigid therewith. A pair of arms 177 are disposed on opposite sides of the toothed disk 176 and their lower ends are rigidly fixed to hubs 178 which are rotatably disposed on the shaft between the arms of the bearing bracket. The arms 177 support a pawl block 180 to which is pivotally secured a pawl 182 whose lower free end engages the teeth of the toothed disk. The upper ends of the arms 178 have pivotally secured thereto the links 183 and 184 by means of a pivot link 185. The lower ends of the links 183 and 184 are pivotally secured by any suitable means, as by a pivot pin 186, to the upstanding arm 190 of the link 192 whose upper end is pivotally connected to the pivot pin 185 and whose lower end is rigidly secured, as by welding, to the link 151 intermediate its ends. It will be apparent that the link 192 will oscillate with the link 151 and that during each complete oscillation of the link, the arms 178 are pivoted in a counter-clockwise direction relative to the shaft 172, the free end of the pawl engaging one of the teeth of the toothed disk 176 and cause it to rotate through a predetermined small angle, and then the arms are pivoted in a clockwise direction causing the pawl to ride over the next adjacent tooth. In this manner the shaft 172 of the beater 170 is rotated in a step by step manner.

The upper beater 171 includes a shaft 195 which extends through suitable apertures in the side walls and is journaled in bearing blocks 196 and 197 rigidly secured to the sides 105 and 106 in any suitable manner, as by welding. The bearing block 197 is bifurcated and a sprocket 198 rigidly secured to the shaft 195 is disposed in the bearing block. A chain 199 extends about the sprocket 198 and about a sprocket 200 rigidly secured to the shaft 172 so that the shaft 195 will rotate in unison with the shaft 172. The shafts 172 and 195 are provided with outwardly extending prongs or fingers 204 and 205, respectively.

It will be apparent that the fingers 205 and 204 will engage the cut forage and will tend to hold it between the walls of the box even though the box is not provided with a front wall or side. At the same time the fingers due to their step by step or intermittent rotation break up any clumps of the forage and thus prevent blocking of the movement of the forage to the side conveyor due to undue compacting of the forage. The beaters however move slowly and do not throw the forage about.

In use, the brackets 18 of the rigid tongue 117 are secured to the draw bar of a tractor and the main drive shaft 60 thereof is secured to the power takeoff of the tractor. The transporting and unloading device is then moved to the area where it is to be loaded with cut forage or the like. The forage is loaded into the box 90 through the open top thereof and is supported there by the floor 91. When the box is fully loaded with forage, the transporting and loading device is drawn by means of the tractor to the place where it is to be unloaded, as into feeding troughs. During such movement of the transporting and loading device from one location to another, the drawstring 165 is pulled up to move the pawl 161 out of engagement with the toothed disk 164 so that neither the main conveyor 130 nor the beaters 170 or 171 are articulated. The beaters 170 and 171 of course maintain the forage in the box even though the box does not have a front wall. When the transporting and loading device is adjacent the feeding troughs into which the forage is to be unloaded, the side conveyor extension 38 is lowered to an unloading position projecting above the trough and is secured thereto in such position by means of the rod 44 whose outer end is now placed in the intermediate aperture in the side 39 of the side delivery conveyor. The pawl 161 is then allowed to move into engagement with the toothed disk 164 and the reciprocation of the link 151 causes the main conveyor to move about the main floor 91 in an intermittent or step by step manner moving the forage toward the open front end of the box. The beaters 170 and 171 are also rotated slowly and intermittently to break up any clumps of forage and permit it to be dropped over the front end of the floor onto the side conveyor floor 35 which is disposed at a lower level than the box floor 91. The side conveyor then moves the forage laterally over its extension and into the trough. While this unloading operation takes place, the forage unloader is moved longitudinally parallel to the feeding trough with the extension projecting over the trough. In the event that forage is deposited at too great a rate upon the side conveyor by the action of the main conveyor and the beaters so that it tends to choke the side conveyor, the movement of the main conveyor may be stopped by disengaging the ratchet pawl. With the continued action of the beaters and side conveyor the overflow is cleared and normal action is resumed.

It will be apparent that the center of gravity of the transporting and unloading device is quite low since the floor is disposed below the upper rims of the wheels so that the transporting and unloading device may be moved over very rough terrain without danger of it tipping even though a very heavy load is being carried. The outwardly flared side and rear walls permit a large load to be carried by the wagon even though the wheel base or distance between the wheels is comparatively small.

It will now be seen that a new and improved transporting and unloading device for forage and the like has been illustrated and described which includes a chassis having a pair of ground engaging wheels and a box mounted on the chassis having a pair of parallel sides, a rear wall and a bottom or floor which is disposed between the wheels and below the upper edges thereof.

It will further be noted that since a passage must be provided underneath the floor for the underpart of the main conveyor to pass through, the feature of the floor being disposed between the wheels allows the construction of the framework to be most simple requiring a minimum of material.

It will further be seen that the open front end of the box is provided with a pair of vertically spaced transversely extending beaters 170 and 171 which prevent uncontrolled spillage of the forage through the open front end and which are rotatable to break up clots or clumps of forage and to cause the forage to be moved through the open end of the box onto a transverse or side conveyor 25 disposed at a lower level than the floor of the box.

It will further be apparent that a main conveyor is provided on the box to move the forage toward the front end, to the beaters and to the side conveyor.

It will further be seen that the transporting and unloading device is provided with a main shaft which is continuously connected to the side conveyor whereby the side conveyor is operative at all times the main shaft is rotated and that a transmission is provided which connects the main shaft with the box conveyor and the beaters to cause the main conveyor and the beaters to be actuated in a step by step manner whereby the forage is caused to be unloaded in a controlled manner through the open end without undue scattering.

It will further be seen that this transmission includes a ratchet and pawl means which are actuated by the link 151 eccentrically connected to the drive disk 153 of the rotatable shaft 80 which is driven by the main shaft.

It will further be seen that the main shaft may be driven by any suitable means, such as the power takeoff shaft of a tractor which may be connected to the tongue 17 of the transporting and unloading device to move it to any desired location.

It will further be seen that the loading and transporting device has a side conveyor extension 38 which extends outwardly to the right and that the transmission connecting the main shaft to the side conveyor 25 has a minimum number of parts since no direction changing gears need be interposed between the drive shaft and the drive chains and sprockets of the side delivery conveyor because the power takeoff shafts of conventional tractors always rotate the main drive shaft in the direction indicated by the arrow in FIGURE 1.

It will now be apparent that a new and improved forage transporting and unloading device has been illustrated and described which is of simple economical construction, has a very low center of gravity so that it can safely carry a maximum load over uneven terrain, and is provided with beaters which are rotated intermittently and slowly so that they do not throw the forage forwardly which would occur if the beaters were rotated in a quick, continuous manner.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; a rotatable main shaft; and means connecting said main shaft to said beaters and to said main conveyor for selectively and intermittently actuating said beaters and said main conveyor.

2. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; a rotatable main shaft; and means connecting said main shaft to said main conveyor and to said beaters for selectively and intermittently actuating said beaters and said main conveyor, said chassis being provided with a pair of ground engaging wheels, said floor being disposed between said wheels and below the upper edges of the wheels 3. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; and means for selectively and intermittently actuating said beaters and said main conveyor, said means for actuating said main conveyor and said beaters including a rotatable main shaft and ratchet and pawl means connecting said main shaft to said main conveyor and to said beaters for intermittently actuating the beaters and the main conveyor when said main shaft is rotated.

4. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly towards the side conveyor and the beaters; and means for selectively and intermittently actuating said beaters and said main conveyor, said chassis being provided with a pair of ground engaging wheels; said floor being disposed between said wheels and below the upper edges of the wheels, said means for actuating said main conveyor and said beaters including a rotatable main shaft and ratchet and pawl means connecting said main shaft to said main conveyor and to said beaters for intermittently actuating the beaters and the main conveyor when said main shaft is rotated.

5. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; means for selectively and intermittently actuating said beaters and said main conveyor, said means for actuating said main conveyor and said beaters including a rotatable main shaft and ratchet and pawl means connecting said main shaft and said main conveyor and said beater for intermittently actuating the beaters and the main conveyor when said main shaft is rotated, said main conveyor comprising a conveyor shaft extending transversely between the sides of the box and forwardly of the floor thereof and having means engageable with said main conveyor; said main conveyor extending about the floor and having an upper portion extending above the floor and a lower portion below the floor; and means connecting said main shaft and said conveyor shaft for rotating said conveyor shaft when said main shaft is rotated, said upper portion being movable forwardly toward the open end of the box when said conveyor shaft is rotated.

6. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; and means for selectively and intermittently actuating said beaters and said main conveyor, said means for actuating said main conveyor and said beaters including a rotatable main shaft and ratchet and pawl means connecting said main shaft and said main conveyor and said beaters for intermittently actuating the beaters and the main conveyor when said main shaft is rotated, said ratchet and pawl means including a toothed disk rigidly secured to the main conveyor drive shaft, an arm pivotally mounted on said main shaft pawl having a free end engageable with the teeth of the said toothed disk and having its other end pivotally connected to said arm, and means connecting said main shaft to said arm for oscillating the arm to cause said free end of said pawl to periodically engage said toothed disk and rotate it in step by step manner.

7. A device of the type described comprising: a mobile chassis; a box mounted on the chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; a drive shaft rotatably mounted forwardly of said main floor for moving said conveyor about the main floor of the box; and means for selectively and intermittently actuating said beaters and said main conveyor, said means for actuating said main conveyor and said beaters including a rotatable main shaft and ratchet and pawl means connecting said main shaft and said main conveyor and said beaters for intermittently actuating the beaters and the main conveyor when said main shaft is rotated, said ratchet and pawl means including a toothed disk rigidly secured to the main conveyor drive shaft, an arm pivotally mounted on said main shaft pawl and having a free end engageable with the teeth of the said toothed disk and having its other end pivotally connected to said arm, means connecting said main shaft to said arm for oscillating the arm to cause said free end of said pawl to periodically engage said toothed disk and rotate it in step by step manner, said means for imparting oscillatory movement to said arm including a link having one end connected to said arm and the other end connected to said disk eccentrically of said axis, said beaters being rotatable about transverse axes, and means connected to said link and said beaters for intermittently rotating said beaters when said main shaft is rotated.

8. A device of the type described comprising: a mobile chassis; a box mounted on a chassis and having an open front end, a pair of sides, a rear wall and a floor extending between the side walls; a side conveyor movable transversely relative to the box floor and spaced vertically below the main floor adjacent the front end of the box; a pair of vertically spaced beaters extending transversely across the front open end of the box; a main conveyor movable about the main floor of the box for moving material of the box forwardly toward the side conveyor and the beaters; means for selectively and intermittently actuating said beaters and said main conveyor, said means for actuating said main conveyor and said beaters including a rotatable main shaft and means connecting said main shaft and said main conveyor and said beaters for intermittently actuating the beaters and the main conveyor when said main shaft is rotated, said main conveyor comprising a conveyor shaft extending transversely between the sides of the box and forwardly of the floor thereof and having means engageable with said main conveyor, said main conveyor extending about the floor and having an upper portion extending above the floor and a lower portion below the floor; and means connecting said main shaft and said conveyor shaft for rotating said conveyor shaft when said main shaft is rotated, said upper portion being movable toward the open end of the box when said conveyor is rotated.

References Cited in the file of this patent

UNITED STATES PATENTS

| | | |
|---|---|---|
| 2,676,002 | Wolfe | Apr. 20, 1954 |
| 2,676,721 | Hansen | Apr. 27, 1954 |
| 2,771,203 | Collins et al. | Nov. 20, 1956 |
| 2,822,946 | Vandrisse | Feb. 11, 1958 |